United States Patent [19]
Pillote

[11] 4,082,154
[45] Apr. 4, 1978

[54] WEIGHING SCALE APPARATUS
[75] Inventor: Vernon J. Pillote, Rockford, Ill.
[73] Assignee: The Brearley Company, Rockford, Ill.
[21] Appl. No.: 778,495
[22] Filed: Mar. 17, 1977
[51] Int. Cl.² .......................... G01G 3/14; G01G 3/00
[52] U.S. Cl. .................................... 177/211; 177/225
[58] Field of Search .......... 177/210 R, 210 EM, 211, 177/225

[56] References Cited
U.S. PATENT DOCUMENTS

| | | | |
|---|---|---|---|
| 2,403,952 | 7/1946 | Ruge | 73/136 |
| 2,641,460 | 6/1953 | Larson | 177/225 UX |
| 2,899,191 | 8/1959 | Hunt | 177/211 X |
| 3,103,984 | 9/1963 | Ellis et al. | 177/211 |
| 3,460,642 | 8/1969 | Provi et al. | 177/256 |
| 3,469,645 | 9/1969 | Provi et al. | 177/210 R |
| 3,478,618 | 11/1969 | Provi et al. | 177/257 X |
| 3,612,842 | 10/1971 | Aga | 177/3 X |
| 3,666,031 | 5/1972 | Provi et al. | 177/256 X |
| 3,707,076 | 12/1972 | Jones | 177/211 X |
| 3,910,366 | 10/1975 | Terraillon | 177/225 |
| 3,927,726 | 12/1976 | Hanado | 177/210 |

Primary Examiner—George H. Miller, Jr.
Attorney, Agent, or Firm—Morsbach & Pillote

[57] ABSTRACT

A weighing scale apparatus including a base and a scale platform and a plurality of bell cranks pivotally mounted on the base at locations angularly spaced apart about a common center for pivotal movement in planes generally tangent to a circle about the common center. A load summing member is connected to the bell cranks at locations vertically offset from the pivot axes for turning thereby about the common center, and the scale platform is connected to the bell cranks at locations horizontally offset from the pivot axes of the bell cranks in the same angular direction relative to the common center to apply a turning moment to the load summing member correlative with the load on the scale platform. The turning moment applied to the load summing member is sensed as an indication of the load on the scale platform.

25 Claims, 9 Drawing Figures

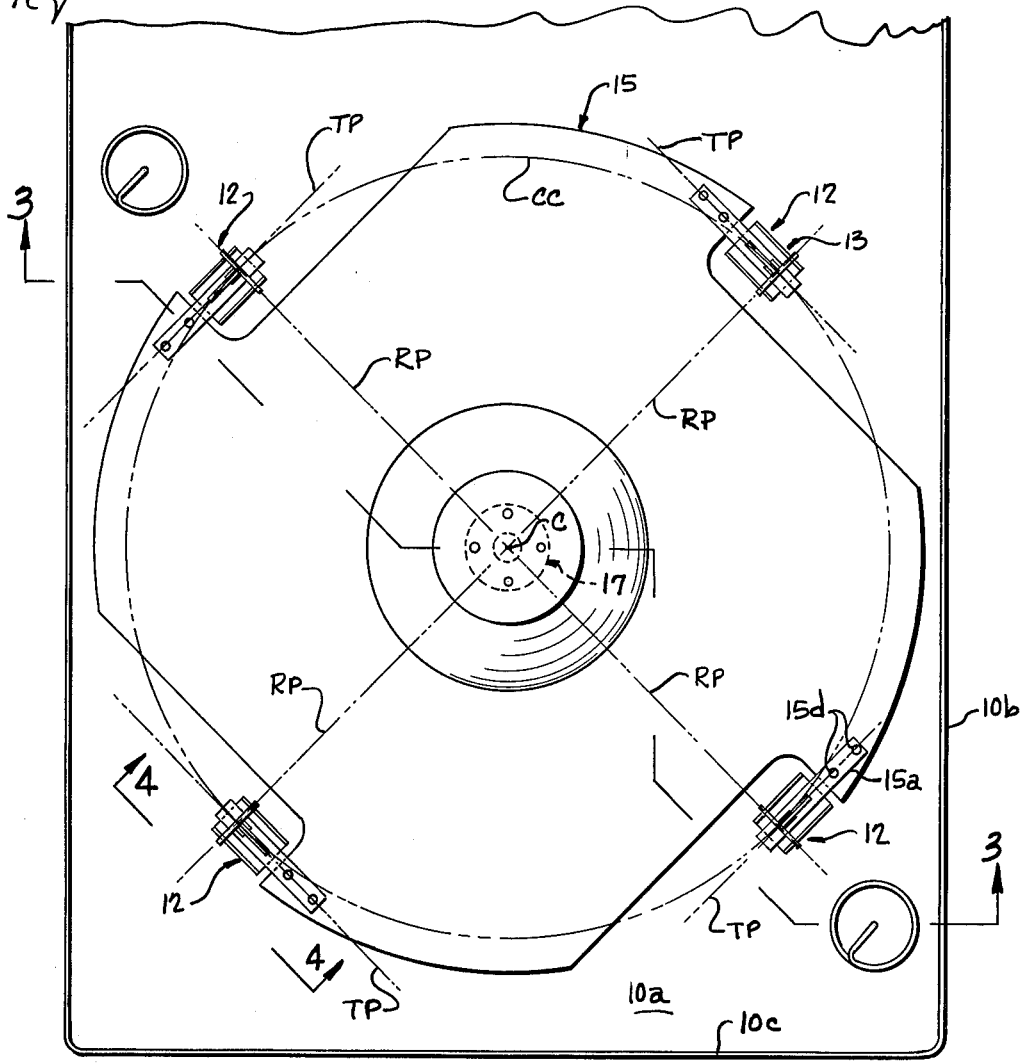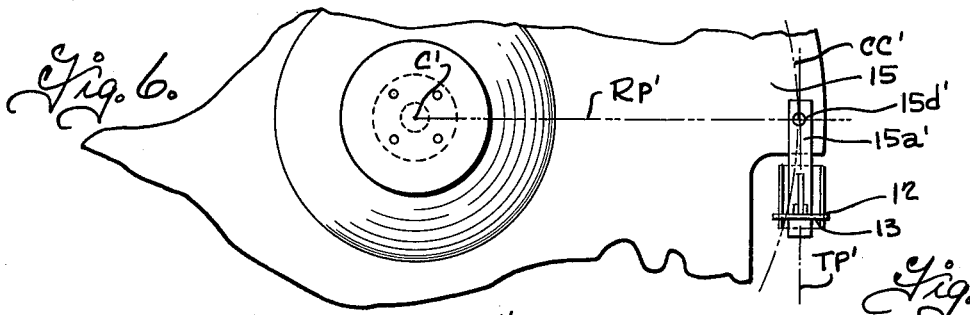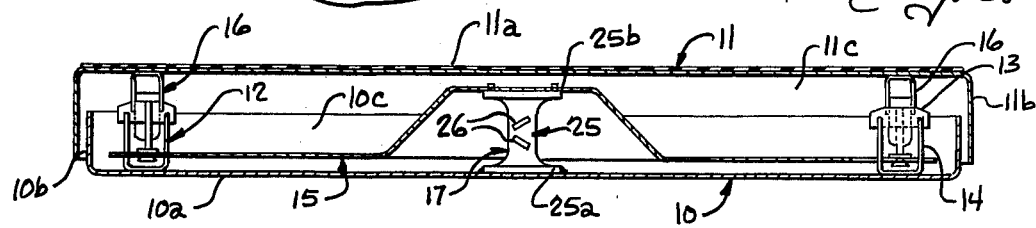

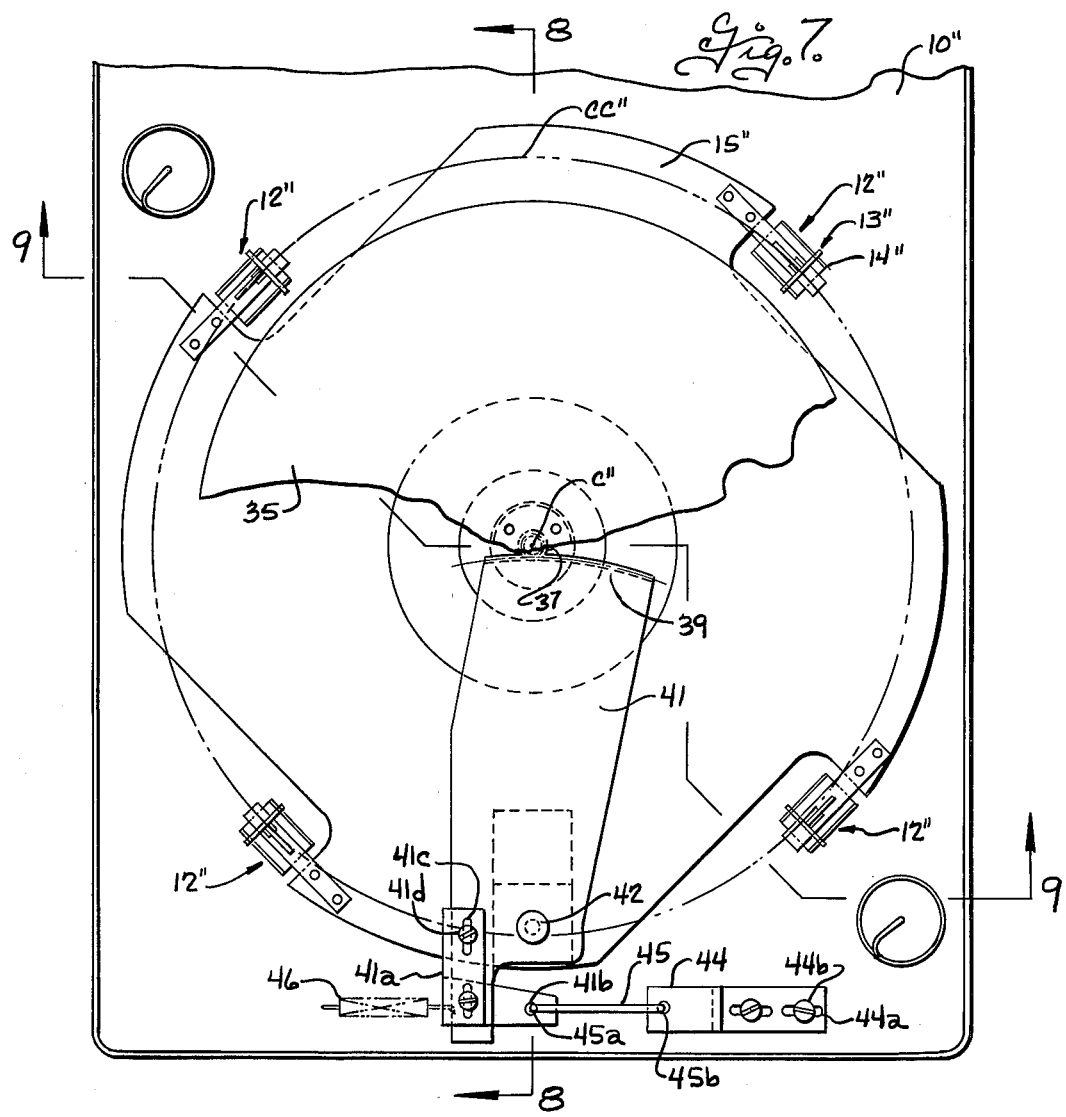
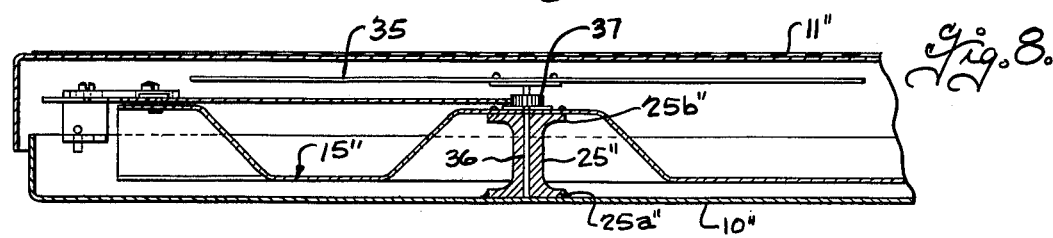
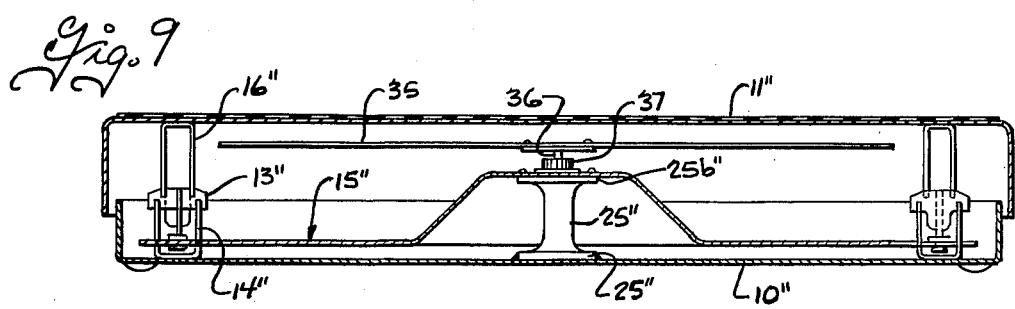

WEIGHING SCALE APPARATUS

BACKGROUND OF THE INVENTION

Platform type weighing scales are commonly subject to non-uniform loading on the scale platform. It is difficult to provide a single platform support for a relatively large scale platform that is capable of withstanding substantial non-uniform loading, and it has heretofore been proposed to make platform scales with a plurality of platform suspensions arranged to support the platform at spaced locations. The loads applied to the scale platform operate in a vertical direction, and it has been common practice to utilize vertically movable links and levers for interconnecting the several platform suspensions with each other and to a weight display. In order to minimize the overall height of the scale, it has also been proposed, for example as shown in U.S. Pat. Nos. 3,460,642; 3,478,818 and 3,666,031, to utilize platform suspensions which include bell cranks arranged so that the vertically applied loads on the scale platform are transmitted by the bell cranks to horizontally movable links and levers which interconnect the several platform suspensions with each other and to the weight display. In the platform scale shown in the aforementioned patents, the four bell cranks are arranged in a generally rectangular pattern on the base for pivotal movement about relatively parallel axes, and first and second horizontally movable links are connected to the first and second pairs of the bell cranks at locations vertically offset from the pivot axes to interconnect the bell cranks in pairs and sum the loads applied to the respective pairs of bell cranks, and the forces applied to the first and second links are, in turn, applied through first and second horizontally movable levers to a spring biased reciprocable rack that rotates a scale dial. Thus, in the above-mentioned patents, the links first sum the loads applied to the first and second pairs of the platform suspensions and the first and second levers respectively transmit the forces applied to the first and second links to a common rack to apply the sum of the forces on the first and second links to the weight indicating device.

SUMMARY OF THE INVENTION

It is the general object of the present invention to overcome the disadvantages of the prior art by providing a platform type weighing scale utilizing a plurality of platform suspensions and having an improved arrangement for directly summing the loads applied to the several suspensions and for actuating a weight indicating display in accordance with the sum of the loads on the several platform suspensions.

A more particular object of this invention is to provide a platform type weighing scale utilizing a plurality of platform suspensions and having a load summing member connected to the several platform suspensions in such a manner that the vertically applied loads on the several platform suspensions produce a turning moment in the load summing member about a generally upright axis correlative with the sum of the loads applied to the several suspensions.

Accordingly, the present invention provides a platform type weighing scale including a base scale member and a platform scale member, a plurality of bell cranks pivotally mounted on one of the scale members at locations angularly spaced apart about a common center for pivotal movement in planes generally tangent to a circle about the common center, a load summing member connected to each of the bell cranks at locations vertically offset from the pivot axes for turning thereby about the common center, means connecting the other scale member to each of the bell cranks at locations horizontally offset from the pivot axis of the bell cranks in the same angular direction relative to the common center to apply a turning moment to the load summing member correlative with the loads on the scale platform member, and means for sensing the turning moment applied to the load summing member as an indication of the load on the scale platform.

The turning moment applied to the load summing member can be sensed by a torquemeter connected between the load summing member and one of the scale members. Alternatively, the turning moment applied to the load summing member can be sensed by sensing rotary motion of the load summing member produced by the turning moment on the load summing member. These, together with other objects, features and advantages of the invention will be more readily understood by reference to the following detailed description, when taken in connection with the accompanying drawings wherein:

FIG. 2 is a fragmentary horizontal view of one embodiment of the scale, with the scale platform removed to illustrate details of construction;

FIG. 3 is a vertical sectional view through the scale taken on the plane 3—3 of FIG. 2;

FIG. 6 is a fragmentary horizontal sectional view illustrating a modified form of the scale of FIGS. 1-5;

FIG. 7 is a horizontal view of another embodiment of the scale with the scale platform removed and parts broken away to illustrate details of construction;

FIG. 8 is a fragmentary vertical sectional view taken on the plane 8—8 of FIG. 7; and FIG. 9 is a vertical sectional view taken on the plane 9—9 of FIG. 7.

Figure 1:
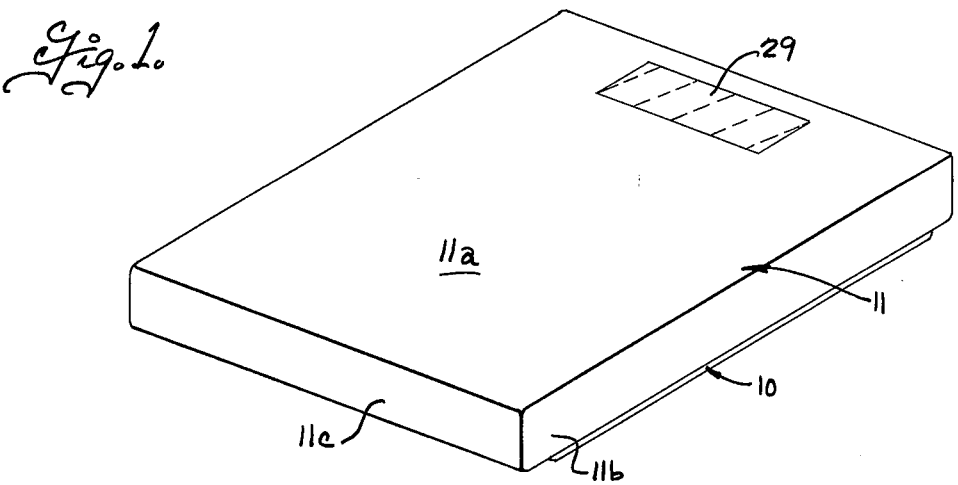
FIG. 1 is a perspective view of a scale embodying the present invention.
Figure 4:
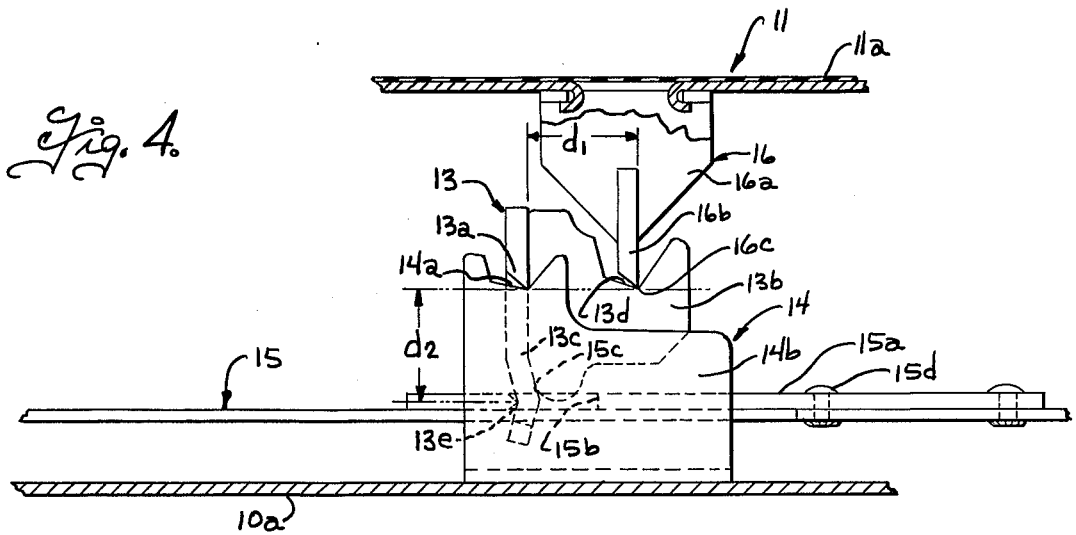
FIG. 4 is a fragmentary vertical sectional view taken on the plane 4—4 of FIG. 2 and illustrating parts on a larger scale.

Referring now more specifically to the embodiment of FIGS. 1-5, there is shown a scale having a scale base 10 and a scale platform 11 overlying the base, with a plurality of platform suspensions 12, herein shown four in number, for mounting the platform on the base. The four platform suspensions each include a bell crank 13 mounted on the base by a base bracket 14 at locations angularly spaced apart about a common center C for pivotal movement about horizontal pivot axes in upright planes generally tangent to a circle about the common center. A load summing member 15 is connected to each of the bell cranks at locations vertically offset from the pivot axes of the bell cranks for turning thereby about the common center in response to turning of the bell cranks in the same sense about their respective pivot axes. The scale platform 11 is connected to each of the bell cranks by platform brackets 16 which engage the bell cranks at locations horizontally offset from the respective pivot axis of the bell cranks in the same angular direction relative to the common center and such that the several bell cranks turn in the same sense about their respective pivot axis in response to the application of a load to the scale platform, to thereby apply a turning moment to the load summing member correlative with the load on the scale platform. A means 17 is provided for sensing the turning moment applied to the load summing member as indication of the load on the scale platform.

The base 10 can be of any suitable construction and, in the embodiment shown, comprises a bottom wall 10a with upstanding side and end flanges 10b and 10c. The platform 11 includes an upper load applying surface 11a and depending side and end flanges 11b and 11c.

The bell cranks 13, base brackets 14, and platform brackets 15 can be of any suitable construction and are conveniently of the type more fully disclosed in the aforementioned U.S. Pat. Nos. 3,460,642 and 3,478,818, to which reference is hereby made for more complete description. In general, the bell cranks 13 shown herein each includes laterally extending trunnions 13a, conveniently formed with knife edges that engage in wide angle V-notches 14a formed in spaced legs 14b of the base bracket 14, so that the bell cranks are pivotally supported on the base brackets for pivotal movement about generally horizontal pivot axes. The bell cranks include a laterally extending leg 13b and a downwardly extending leg 13c. The platform brackets 16 are arranged to engage the lateral leg 13b of the bell cranks at a location horizontally offset from the pivot axis defined by trunnion 13a and, as shown, the lateral legs of the bell cranks are formed with an upwardly opening wide angle V-notch 13d.

The platform brackets include a U-shaped bracket member 16a having a platform hanger on fulcrum member 16b mounted thereon and formed with a knife edge 16c at its underside adapted to engage the notch 13d in the bell crank. As previously described, the load summing member is connected to the bell cranks at locations vertically offset from the pivot axes defined by fulcrums 13a and for this purpose the downwardly extending leg 13c of each bell crank is formed with a laterally opening V-notch 13e the apex of which is vertically offset below the trunnions 13a. Bell crank engaging members 15a are provided on the load summing member at circumferentially spaced locations and, in the embodiment shown, are in the form of links having an opening 15b adapted to loosely receive the leg 13c of the bell crank and with a knife edge 15c at one end of the opening adapted to engage the V-notch 13e of the downwardly extending leg of the bell crank. The load summing member 15 is herein shown in the form of a dish-shaped body which is notched as indicated at 15d at its periphery to provide clearance for the platform suspension 12. In the embodiment illustrated in FIGS. 1-4, the links 15a are rigidly secured to the load summing member at angularly spaced locations as by fasteners 15d, it being apparent that the links could be formed as an integral part of the load summing member, if desired. Alternatively, the links designated 15a' can be pivotally or swivelly attached to the load summing member 15 as by connectors 15d' as shown in FIG. 6, so that the links extend generally tangentially of the load summing member and transmit forces applied thereto generally circumferentially of the load summing member.

The base brackets 14 are arranged to support the bell cranks 13 at locations angularly spaced apart about the center C with the trunnions on pivot axes of the bell cranks arranged so that the bell cranks pivot in planes TP. The bell cranks are mounted for pivotal movement in planes TP having at least a substantial component tangent to a circle CC about the common center C, in order to apply forces to the load summing member in a circumferential direction, and it is preferable that the planes TP be generally tangent to the circle CC, to minimize radial forces on the load summing member. When the links 15a are rigid with the load summing member as shown in FIGS. 1-4, the knife edge 15c cannot move radially relative to the center C. With this arrangement, the pivot axes of the trunnions of the bell cranks 13 are preferably disposed approximately in planes RP that extend radially of the center C through the location where the knife edge 15c on each link 15 engages the leg 13c on the respective bell crank. Alternatively, when the links 15a' are pivotally or swivelly attached to the load summing member by a connector 15d' as shown in FIG. 6, the pivot axes of the trunnions of the bell cranks 13 are preferably disposed in planes parallel to and offset from planes RP' that extend radially of the center C' through the location where the respective link 15a' is connected to the load summing member by its connector 15d'. Thus, in the modification of FIG. 6, the bell cranks 13 pivot in planes TP' generally tangent to a circle CC' about the center C, but the pivot axes of the bell cranks are preferably parallel to and offset along the plane TP' from the respective radial plane RP' through the connectors 15d' by a distance corresponding to the effective length of the links 15a'.

The bell cranks are each arranged on the base brackets so that they face in the same circumferential direction with respect to the center C. Thus, the laterally opening V-notches 13e on the several platform suspensions all face in the same direction; that is clockwise as viewed in FIG. 2. Similarly, the upwardly opening V-notches 13d in the lateral legs 13b of the bell cranks are horizontally offset from the trunnions in the same angular direction relative to the center C and, in the embodiment shown, are angularly offset in a counterclockwise direction as viewed in FIG. 2. The platform hanger or fulcrum member 16b on the platform supports are arranged so that their knife edges 16c generally parallel the trunnions 13a of the bell cranks. The bell cranks are preferably right angle bell cranks in which the fulcrums 13a, the apex of the upwardly opening V-notch 13d and the apex of the laterally opening V-notch 13e define a substantially right angular relation. In addition, the legs of the bell cranks are preferably equal, that is the horizontal offset distance designated d1 between the fulcrum 13a and the upwardly opening V-notch 13d is made substantially equal to the vertical offset distance d2 between the fulcrum 13a and the laterally opening V-notch 13e. It is to be understood, however, that the relative offset distances can be made unequal if desired, for example for motion amplification. In addition, it will be appreciated that the horizontal and vertical offset distances d1 and d2 will change somewhat as the bell cranks turn about trunnions 13a. In the embodiments of FIGS. 1-5 and 6, the motion of the bell cranks is so small that changes in the offset distances d1 and d2 during a weighing operation will be negligible. However, the ratio of the horizontal and vertical offset distances d1 and d2 can be maintained substantially constant in the range of movement contemplated in the scale apparatus, if right angle bell cranks having legs of equal length, are used.

As will be readily understood, a weight applied to the scale platform 11 is transmitted to the several platform suspensions and the load applied to each of the suspensions will vary somewhat dependent on the load distribution on the scale platform. However, the load on each platform suspension applys a force on each of the bell cranks at a location horizontally offset from the pivot axis of the bell cranks and the bell cranks transmit a horizontally directed force to the links 15a correlative with the vertically applied force. The links 15a are spaced a similar distance from the center C and each applies a turning moment in the same direction on the load summing member which is correlative with the force applied to the respective platform suspension, and the total turning moment on the load summing member is therefore correlative with the total load on the scale platform.

In the embodiments of FIGS. 1-5 and 6, the turning moment on the load summing member is sensed by a torquemeter which is connected to the load summing member adjacent the center C and also to the base 10. In the embodiments illustrated, the torquemeter comprises a torsion member 25 having one end 25a non-rotatably connected to the base 10 and the other end 25b non-rotatably connected to the load summing member 15. The torsion member can conveniently be in the form of a spool-shaped body of an elastically deformable material such as steel in which the enlarged heads 25a and 25b are provided to facilitate non-rotatable attachment to the base and load summing member respectively as by rivets, keys, welding or the like. The intermediate portion of the body is of a cross-sectional size correlated with the material so as to be stressed within the elastic limit of the material under the loads encountered in the weighing apparatus. The torsional stresses in the member 25 are sensed by an electrical transducer 26 mounted on the torsion member 25 and the transducer 26 preferably includes a pair of strain gauge elements arranged at an angle about 45° with respect to the axis of a torsion member so as to sense torsional stresses produced in the member in response to the turning moment on the load summing member. The strain gauges may, for example, be of the variable resistance type or the piezo resistance type. Alternatively, other forms of torquemeters could be used, for example as shown in U.S. Pat. No. 2,403,952.

Figure 5:
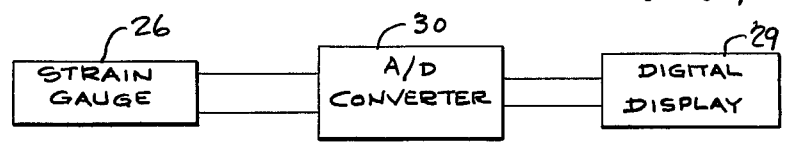
FIG. 5 is a block electrical diagram for the scale of FIGS. 1-4.

The output of the transducers 26 is utilized to actuate a visual display. The visual display can take various forms and may, for example, include an electrical meter responsive to the change in impedance of the strain gauges produced by the torsional forces applied to the torsion member 25 and calibrated to indicate weight applied to the platform. In the embodiment illustrated, the strain gauges are arranged to actuate a digital type visual display 29 and, as diagrammatically shown in FIG. 5, are connected through an analog-to-digital converter 30 that is operative to actuate the digital display from the analog output of the strain gauges.

The weigh apparatus shown in the embodiment of FIGS. 7-9 is similar to that shown in the embodiments shown in FIGS. 1-6 and like numerals followed by the postscript " are used to designate corresponding parts. As in the preceding embodiment, the scale includes the base 10", a platform 11" and a plurality of platform suspensions 12". The platform suspensions 12" each include a bell crank 13", a base mounting bracket 14", a load summing member 15", and platform brackets 16". The platform brackets support the bell cranks at locations angularly spaced apart about a common center C' for pivotal movement about horizontal pivot axes in planes generally tangent to a circle CC", and the load summing member 15" is connected to each of the bell cranks at locations vertically offset from the pivot axes for turning thereby about the common center. The platform brackets connect the platform to each of the bell crank members at locations horizontally offset from the pivot axes of the bell cranks in a same angular direction relative to the common center to apply a turning moment to the load summing member correlative with the load on the scale platform.

In the embodiment of the FIGS. 7-9, the turning moment on the load summing member 15" is sensed by sensing the turning motion of the load summing member produced by the turning moment. A spring means is provided for yieldably opposing turning movement of the load summing member and, as shown in FIGS. 7-9, the spring means is in the form of a spool 25" having heads 25a" and 25b' at opposite ends non-rotatably attached to the base and load summing member respectively as by welding, fasteners or the like and which spring member is formed of a material such as steel and of a size to allow a preselected angular motion in the order of a few degrees in response to the maximum turning moment on the load summing member produced by a full load on the scale platform. In order to facilitate indication of the relative small angular motion of the load summing member, a motion amplification apparatus is provided for amplifying the turning motion of the load summing member and applying the amplified motion to a load indicator. In the embodiment illustrated, the load indicator is in the form of a scale dial 35 mounted for rotation about an axis coincident with the center C" on a shaft 36. As shown in FIG. 8, the shaft 36 is conveniently journaled in a bore formed in the spool member 25" and a bearing insert could be provided if desired. A pinion 37 is non-rotatably attached to the shaft and the pinion is rotated by a sector gear 39. The motion multiplication apparatus includes a lever 41 pivotally supported intermediate its ends at 42 on the load summing member adjacent its outer periphery for pivotal movement relative thereto about an axis parallel to and spaced radially from the center C". The sector gear 39 is provided on the inner end of the lever 41 and meshes with the pinion 37 to rotate the pinion and scale dial 35 in response to angular movement of the lever. The outer end of the lever 41 is anchored to the scale base at a location spaced radially outwardly of the pivot 42 so that turning of the load summing member 15" will cause angular motion of the lever 41 and rotations of dial 35. The motion amplification produced by the lever 41 is advantageously made adjustable and, as shown in FIG. 7, the lever 41 has an end portion 41a defining a pivot point 41b, and which portion 41a is mounted as by slots 41c and fasteners 41d for adjustment relative to the main lever 41 in a direction to change the radial spacing between the pivot 41b and the pivot 42. The pivots 41b and 42 are preferably disposed in a plane generally radially of the center C" and, as will be seen, adjustment of the pivot 41b relative to the pivot 42 changes the effective motion amplification produced by the lever. In this manner, the degree of angular rotation of the scale dial produced by the application of given turning moment on the load summing member, can be varied to compensate for different spring rates of spring members 25". The pivot point 41b is anchored to the base by an anchor apparatus 44 which anchor conveniently includes a link 45 having one end portion 45a engaging the pivot 41b on the lever 41 and the other end portion 45b engaging the bracket 44. The bracket 44 is advantageously mounted as by slots 44a and fasteners 44b for adjustment relative to the base in a direction perpendicular to the radial plane through the center C″, to thereby facilitate adjustment of the zero position of the scale dial. A light spring indicated at 46 is advantageously connected to the scale base and to the lever 41 at a location substantially aligned with the link 45, to take up any lost motion in the pivots.

From the foregoing it is thought that the construction and operation of the scale will be readily understood. The weight applied to the scale platform 11 is transmitted to the several platform suspensions and the load applied to each suspension will vary somewhat dependent upon the load distribution on the scale platform. However, the bell crank in each platform suspension will apply a force to the load summing member in a direction circumferentially of the load summing member which is correlative with the load on that platform suspension and the turning moments produced by the several bell cranks on the load summing member will produce a total turning moment on the load summing member correlative with the total member on the scale platform. The turning moment on the load summing member can then be detected by the torquemeter as described in the embodiments of FIGS. 1–5 and 6 in which an electrical transducer produces an analog electrical output correlative with the stresses in the torquemeter produced by the turning moment on the load summing member. The analog electrical signal from the electrical transducer can be used to either operate an analog type electrical indicator such as a meter or a digital type indicator through the use of an analog-to-digital converter. Alternatively, the turning moment applied to the load summing member can be sensed by sensing the motion of the load summing member and the motion of the load summing member is preferably amplified as shown in FIGS. 7–9 and used to operate a scale dial 35. The scale dial can be provided with visual indicator such as numerals to provide a direct visual display, for example as disclosed in U.S. Pat. No. 3,666,031 or alternatively, the motion of the scale dial can be coded and sensed electrically or magnetically and used to operate an electrical type visual display, for example as shown in U.S. Pat. Nos. 3,612,842; 3,853,191 and 3,927,726.

The embodiments of the invention in which an exclusive property or privilege is claimed are defined as follows:

1. A weighing scale apparatus comprising: a base scale member and a platform scale member spaced from the base scale member, a plurality of bell cranks, each having a pivot axis, bell crank pivot means mounting the several bell cranks on one of said scale members at locations angularly spaced apart about a common center for pivotal movement in planes having at least a substantial component tangent to a circle about said common center, a load summing member adapted for turning about said common center, means connecting the several bell cranks at locations vertically offset from the respective pivot axis to said load summing member at angularly spaced locations thereon for turning the load summing member about said common center, means connecting the other of said scale members to each of said bell cranks at locations horizontally offset from the pivot axes of the bell cranks in the same angular direction relative to said common center to apply a turning moment to said load summing member correlative with the load on the scale platform member, and means for sensing the turning moment applied to the load summing member as an indication of the load on the platform scale member.

2. A weighing scale apparatus according to claim 1 wherein said bell cranks are mounted for pivotal movement in planes generally tangent to a circle about the common center.

3. A weighing scale apparatus according to claim 1 wherein said means for sensing the turning moment includes torque reaction means connected to said load summing member and to one of said scale members.

4. A weighing scale apparatus according to claim 1 wherein said means for sensing the turning moment includes torque reaction means connected to said load sensing member and to one of said scale members, and electrical transducer means for sensing stresses produced in said torque reaction means by said turning moment on the load summing member.

5. A weighing scale according to claim 1 wherein said means for sensing the turning moment includes a torsion member at said common center connected to said load summing member and to said one of said scale members, and electrical transducer means for sensing torsional stresses produced in said torsion member by said turning moment on the load summing member.

6. A weighing scale apparatus according to claim 1 wherein said means for sensing the turning moment includes spring means yieldably opposing turning of said load summing member about said common center, and weight indication means responsive to rotary motion of said load summing member produced by said turning moment.

7. A weighing scale apparatus according to claim 1 wherein said means for sensing turning movement includes spring means yieldably opposing turning of said load summing member about said common center, a rotary dial mounted for rotation about said common center and having pinion means connected thereto, and motion amplifying lever means connected to said load summing member and to one of said scale members and having rack means meshing with said pinion means for rotating said scale dial in response to turning of said load summing member about said common center.

8. A weighing scale apparatus according to claim 1 wherein said bell cranks are mounted for pivotal movement in planes generally tangent to a circle about the common center, said means connecting the bell cranks to said load summing member including links rigid with said load summing member, said pivot axes of said bell cranks extending generally radially of said common center.

9. A weighing scale apparatus according to claim 1 wherein said bell cranks are mounted for pivotal movement in planes generally tangent to a circle about the common center, said means connecting the bell cranks to the load summing member including links swivelly attached to the load summing member and extending in a direction generally tangent thereto to a respective one of the bell cranks, the pivot axes of each bell crank extending generally parallel to a plane radially of said common center at the location where the respective link is swivelly connected to the load summing member.

10. A weighing scale apparatus according to claim 1 wherein said means for sensing the turning moment includes spring means yieldably opposing turning of said load summing member about said common center, motion amplifying lever means pivotally connected intermediate its ends to said load summing member, anchor means for connecting one end of said motion amplifying lever means to said one of said scale members, and weight indicator means responsive to motion of the other end of said motion amplifying lever means.

11. A weighing scale apparatus according to claim 10 including means for adjusting the motion amplification produced by said motion amplifying lever means.

12. A weighing scale apparatus according to claim 1 wherein said means for sensing the turning moment includes spring means yieldably opposing turning of said load summing member about said common center, weight indicator means, and motion amplifying means connected to said load summing member and to said one of said scale members and to said weight indicator means for moving said weight indicator means through a distance proportional to the rotary movement of said load summing member relative to said one scale member.

13. A weigh scale apparatus according to claim 12 including means for adjusting the motion amplification of said motion amplifying means.

14. A weighing scale apparatus according to claim 1 wherein said motion amplifying lever means is pivotally mounted intermediate its ends on said load summing member, and anchor means pivotally connecting to one end of said lever means to said one of said scale members.

15. A weighing scale apparatus according to claim 14 wherein the pivotal connection of said anchor means to said one end of the lever means is adjustable in a direction radially of the common center to vary the motion amplification.

16. A weighing scale apparatus according to claim 15 wherein the pivotal connection of said anchor means to said one end of the lever means is adjustable in a direction circumferentially of said common center to adjust the zero position of the rotary scale dial.

17. A weighing scale apparatus comprising, a base scale member and a platform scale member spaced above the base scale member, a load summing member adapted for turning about an upright axis, a plurality of bell cranks each having an individual pivot axis, bell crank pivot means mounting the several bell cranks on one of the scale members at locations angularly spaced about said upright axis, means connecting the several bell cranks at locations vertically offset from their respective pivot axis to said load summing member at angularly spaced locations thereon to apply forces to said load summing member in directions to produce a turning moment on said load summing member in response to turning of the bell cranks in the same sense about their respective pivot axis, means connecting the other of the scale members to the several bell cranks at locations horizontally offset from the pivot axes of the bell cranks in the same angular direction relative to said upright axis such that the several bell cranks turn in the same sense about their respective pivot axis in response to the application of a load to the scale platform, and means for sensing the turning moment applied to the load summing member as an indication of the load on the platform scale member.

18. A weighing apparatus according to claim 17 wherein said bell cranks are mounted for pivotal movement in planes generally tangent to a circle about said common center.

19. A weighing apparatus according to claim 17 wherein said bell cranks are mounted for pivotal movement in planes generally tangent to a circle about said common center, said means connecting the bell cranks to said load summing member including links rigid with said load summing member, said pivot axes of said bell cranks extending generally radially of said common center.

20. A weighing apparatus according to claim 17 wherein said bell cranks are mounted for pivotal movement in planes generally tangent to a circle about said common center, said means connecting the bell cranks to said load summing member including links swively attached to said load summing member and extending in a direction generally tangent thereto a respective one of said bell cranks, the pivot axes of the bell cranks extending generally parallel to a plane radially of said common center at the location where the respective link is swively connected to the load summing member.

21. A weighing scale apparatus according to claim 17 wherein said sensing means includes a torquemeter connected to said load summing member and to one of said scale members and having electrical transducer means for sensing stresses produced in the torquemeter by said turning moment on the load summing member.

22. A weighing scale apparatus according to claim 21 wherein said torquemeter comprises a torsion member having one end attached to the load summing member and the other end attached to said one of said scale members.

23. A weighing scale apparatus according to claim 17 wherein said sensing means includes means for sensing turning motion of said load summing member about said upright axis.

24. A weighing scale apparatus according to claim 23 wherein said means for sensing turning motion includes motion amplification means connected to said load summing member for producing a motion proportional to and greater than the turning motion of the load summing member.

25. A weighing scale apparatus according to claim 24 including means for adjusting the motion amplification of said motion amplifying means.

* * * * *